US010607368B1

(12) United States Patent
Trail

(10) Patent No.: US 10,607,368 B1
(45) Date of Patent: *Mar. 31, 2020

(54) CODED TRACKING FOR HEAD-MOUNTED DISPLAYS

(71) Applicant: Facebook Technologies, LLC, Menlo Park, CA (US)

(72) Inventor: Nicholas Daniel Trail, Bothell, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/252,398

(22) Filed: Jan. 18, 2019

Related U.S. Application Data

(63) Continuation of application No. 15/670,735, filed on Aug. 7, 2017, now Pat. No. 10,223,805.

(51) Int. Cl.
*G06T 7/73* (2017.01)
*H04N 5/232* (2006.01)

(52) U.S. Cl.
CPC ...... *G06T 7/74* (2017.01); *G06T 2207/10152* (2013.01); *G06T 2207/30204* (2013.01); *H04N 5/23216* (2013.01)

(58) Field of Classification Search
USPC ........................................................ 382/103
See application file for complete search history.

(56) References Cited

U.S. PATENT DOCUMENTS

| 9,630,098 | B2 * | 4/2017 | Mikhailov | A63F 13/00 |
|---|---|---|---|---|
| 9,691,181 | B2 * | 6/2017 | Watson | G02B 27/2228 |
| 9,921,312 | B2 | 3/2018 | Takano | |
| 10,095,928 | B2 * | 10/2018 | Beall | G06K 9/00671 |
| 10,146,302 | B2 * | 12/2018 | Tokubo | G06F 3/012 |
| 10,223,805 | B1 * | 3/2019 | Trail | G01S 5/163 |
| 10,403,050 | B1 * | 9/2019 | Beall | G06F 3/04817 |
| 2003/0062487 | A1 | 4/2003 | Hiroi et al. | |
| 2017/0091571 | A1 | 3/2017 | Canini et al. | |
| 2018/0329516 | A1 * | 11/2018 | Steedly | G06T 7/85 |
| 2018/0364485 | A1 * | 12/2018 | Mallinson | G02B 27/0172 |

* cited by examiner

*Primary Examiner* — Ishrat I Sherali
(74) *Attorney, Agent, or Firm* — Fenwick & West LLP

(57) ABSTRACT

A coded tracking system includes an imaging device and a target object that includes a plurality of locators emitting light according to a first pattern. An image of the target object captured by the imaging device includes light received by the imaging device from a subset of the plurality of locators. A pattern controller is configured to determine a resolution value for an adjacent pair of light sources in the captured image. The resolution value is indicative of the pattern controller being able to resolve the adjacent pair of light sources as two separate sources. The pattern controller determines a second pattern for the locators based on the resolution value. The second pattern improves a likelihood that the pattern controller can resolve between individual light sources emitting light in the second pattern. The pattern controller instructs the target object for the locators to emit light according to the second pattern.

20 Claims, 5 Drawing Sheets

CODED TRACKING FOR HEAD-MOUNTED DISPLAYS

CROSS REFERENCE TO RELATED APPLICATIONS

This application is a continuation of U.S. patent application Ser. No. 15/670,735, filed Aug. 7, 2017, the contents of which are incorporated herein by reference in its entirety.

BACKGROUND

The present disclosure generally relates to tracking of head-mounted displays, and specifically relates to coded tracking of head-mounted displays.

In conventional tracking systems, an object (such as a head-mounted display) being tracked has a set of embedded devices, such as infrared light emitting diodes (LEDs). An external camera system can track the embedded devices to determine the position and orientation of the object it is tracking. In conventional systems, the pattern of the embedded devices is fixed. For example, all of the embedded devices may be turned on during tracking. When the distance between the object being tracked and the external camera system is too great, the LEDs in the images captured by the external camera system begin to merge, and the external camera system cannot identify unique LED centroids. When the external camera system cannot identify unique LED centroids, it cannot accurately solve for the position and orientation of the object it is tracking.

SUMMARY

Systems and methods for performing coded tracking are described herein. An object being tracked, such as a head mounted display (HMD), has a plurality of locators, such as LEDs, which can be captured by a camera and analyzed to determine the location and orientation of the HMD. In coded tracking, the LEDs on the HMD emit light according to a particular pattern, and the pattern can be changed in response to conditions. For example, if the HMD moves far away from the camera, it may become difficult to resolve adjacent LEDs in an image of the HMD, which leads to errors in the tracking. In response to determining that adjacent LEDs cannot be resolved, a controller can instruct the HMD to emit light according to a different pattern. For example, the new pattern could have fewer LEDs emitting light, with a greater distance between adjacent LEDs that are emitting light. In an image captured of the LEDs emitting in the new pattern, adjacent LEDs that are emitting light can more easily be resolved than with adjacent LEDs in an image of the prior pattern.

More particularly, a coded tracking system for varying an emission pattern of a target object being tracked is described herein. The system includes a device configured to capture data for a target object, such as an image. The target object includes a plurality of locators emitting light according to a first pattern. The data for the target object captured by the imaging device includes signals, such as light signals, received by the device from a subset of the plurality of locators. The system further includes a pattern controller that is configured to determine a resolution value for an adjacent pair of light sources, of the subset of light sources, in the captured data. The resolution value is indicative of the pattern controller being able to resolve the adjacent pair of light sources as two separate sources. The pattern controller determines a second pattern for the plurality of locators based in part on the resolution value. The second pattern improves a likelihood that the pattern controller can resolve between individual light sources emitting light in the second pattern. The pattern controller provides instructions to the target object for the locators to emit light according to the second pattern.

Figure 1:
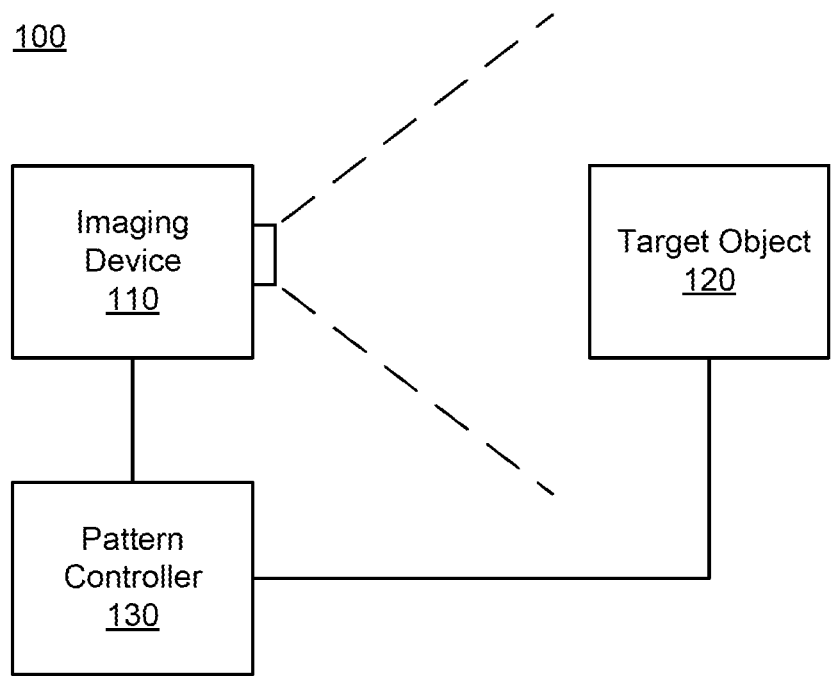
FIG. 1 is a block diagram of a coded tracking system, in accordance with an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

A target object being tracked by a coded tracking system can have a set of external locators, such as LEDs or other light sources. These locators are located in specific positions on the target object relative to one another and relative to a specific reference point on the target object. An imaging device can capture images of the locators, and the images can be processed to determine the position and orientation of the target object. By making these locators controllable, so that the set of locators can output light in different patterns, the position and orientation of the target object can be better tracked at a wider range of distances or other visibility conditions. In general, using a greater number of light sources, and having the light sources be sampled by many elements or pixels on the imaging device, leads to more accurate tracking. However, if the light sources cannot be uniquely distinguished from each other (e.g. blur together on the imaging device), the tracking suffers. Thus, the tracking system described herein can dynamically adjust the pattern of the controllable light sources to provide accurate tracking over a range of distances. This tracking system having the ability to dynamically adjust the patterns emitted by the target object is referred to herein as a "coded" tracking system.

As one example, if the target object is close to the imaging device, the light sources can be set to emit with a first pattern in which all light sources emit light simultaneously. At this close range, all of the simultaneously-emitting light sources can be uniquely identified, and tracking of the position and orientation is highly accurate. If the target object moves farther away from the imaging device, the resolution of the emitting light sources in the image may suffer, making it difficult or impossible to distinguish between adjacent light sources. When the light sources cannot be distinguished, tracking becomes much more error-prone. In this situation, the controllable light sources can be set to emit with a second pattern in which, for example, a subset of the light sources emit light simultaneously, with a larger distance between adjacent, simultaneously-emitting light sources. By having fewer light sources emitting light simultaneously, and increasing the distance between adjacent emitting light sources, the individual light sources can be identified, and tracking is more accurate than it would be with the first pattern at this distance. This second pattern may end up rotating through which subset of all the light sources are simultaneously emitting based on a metric for controlling both the apparent image size and distance between neighboring sources. This allows another improvement in overall tracking at longer ranges, as the digitization errors from a fixed emission pattern can be reduced through the resulting shifts in sub-pixel offsets that would occur when the subset of illumination sources is changed in the second pattern, from one capture to the next.

FIG. 1 is a block diagram of a coded tracking system 100, in accordance with an embodiment. The coded tracking system 100 includes an imaging device 110, a target object 120, and a pattern controller 130. The imaging device 110 is configured to capture an image of the target object 120, and the pattern controller 130 is configured to select a pattern according to which light sources on the target object 120 emits light. The coded tracking system 100 has the ability to perform coded tracking, i.e., dynamically select a pattern for the target object 120 to emit light, and track, using the imaging device 110 and pattern controller 130, the target object 120 emitting the selected pattern.

The imaging device 110 captures images of a local area that includes the target object 120. The imaging device 110 is configured to detect light emitted from locators on the target object 120. The imaging device 110 is configured to capture light in visible band (~380 nm to 750 nm), in the infrared (IR) band (~750 nm to 1700 nm), in the ultraviolet band (200 nm to 380 nm), some other portion of the electromagnetic spectrum that includes light emitted from the locators on the target object 120, or some combination thereof. The imaging device 110 may include one or more cameras, one or more video cameras, any other device capable of capturing data including the locators on the target object 120, or some combination thereof. The imaging device 110 may include multiple devices distributed throughout a region. For example, two or more cameras may positioned in different locations to obtain different images or data captures of the target object 120. The imaging device 110 may include one or more hardware and software filters (e.g., used to increase signal to noise ratio). The imaging device 110 may generate image tracking data in accordance with calibration parameters received from the pattern controller 130. Image tracking data may include one or more images showing observed positions of light sources on the target object 120 that are detectable by the imaging device 110. In some embodiments, image tracking data includes data derived from the captured images, such as data providing centroids of the light emitted from the locators on the target object 120, and may or may not include the image(s) themselves. Image tracking data is communicated from the imaging device 110 to the pattern controller 130, and the imaging device 110 receives one or more calibration parameters from the pattern controller 130 to adjust one or more imaging parameters (e.g., focal length, focus, frame rate, ISO, sensor temperature, shutter speed, aperture, etc.).

The target object 120 is an object that is tracked by the coded tracking system 100. The target object 120 may be, for example, a HMD, a handheld device, or any other object for which position and/or orientation information is desired. The target object 120 includes a plurality of controllable locators for emitting light. These locators may be LED lights or any other controllable locators. The locators are located in specific positions on the target object 120 relative to one another and relative to a specific reference point on the target object 120. The locators are described in greater detail with respect to FIG. 3. The target object 120 includes communications circuitry for receiving instructions from the pattern controller 130. The instructions may specify a pattern at which the target object 120 should emit light. The target object 120 further includes at least one controller for providing signals to the controllable locators in accordance with the pattern.

The target object 120 can control one or more parameters of its locators such that they can generate a plurality of patterns in accordance with emission instructions. A pattern describes a set of parameters assigned to the locators of the target object 120. The set of parameters can be the same for all locators of the target object 120, or various combinations of locators of the target object 120 can be assigned different sets of parameters. The pattern can even set a particular set of parameters for each locator. For example, one pattern can set all locators on, other patterns can set various combinations of locators to be on, other patterns can set all locators or various combinations of locators to emit light at a particular wavelength or wavelengths, emit light at one or more emissivities, or emit light at one or multiple modulations. Additional pattern examples are described herein.

The locators may be located in specific positions on the target object 120 relative to one another and relative to a specific reference point on the target object. A locator may be a light emitting diode (LED), a laser diode, a laser diode array, a light emitting electrochemical cell (LEC), some other active light source, or some combination thereof. In embodiments where the locators are active (i.e., an LED or other type of light emitting device), the locators 315 and 320 may be able to emit light in the visible band (~380 nm to 750 nm), in the infrared (IR) band (~750 nm to 1700 nm), in the ultraviolet band (200 nm to 380 nm), some other portion of the electromagnetic spectrum, or some combination thereof.

One or more controllers in the target object 120 may provide instructions to the locators to emit light according to one or more parameters. Each locator may be individually controlled, or multiple locators may be controlled by the same signal. In some embodiments, the locators are located beneath an outer surface of the target device 120, which is transparent to the wavelengths of light emitted by the locators or is thin enough not to substantially attenuate the wavelengths of light emitted or reflected by the locators. Additionally, in some embodiments, the outer surface or other portions of the target object 120 are opaque in the visible band of wavelengths of light. Thus, the locators may emit light in the IR band under an outer surface that is transparent in the IR band but opaque in the visible band.

Emission instructions (generated by the pattern controller 130) are instructions that determine what pattern is generated by the target object 120. A parameter affects emission of light by a locator. A parameter may include, e.g., intensity, pulse rate, wavelength, time active (i.e., time over which it emits light), time inactive (i.e., time over which it does not emit light), something else that affects emission of light by the locator, or some combination thereof. For example, the target object 120 may be able to control the emissivity or brightness of the locators, so that during a first pattern, the locators are brighter than they are during a second pattern.

The pattern controller 130 determines a pattern at which the target object 120 should direct its locators to emit light, and transmits emission instructions describing this pattern to the target object 120. The pattern controller 130 receives tracking data, which may include images or data derived from captured images, from the imaging device 110. The pattern controller 130 can analyze a captured image received from the imaging device 110 to determine a resolution value for an adjacent pair of locators on the target object 120. The resolution value is indicative of whether the pattern controller 130 is able to resolve the adjacent pair of locators as two separate sources. Based on the resolution value, the pattern controller 130 may select a different pattern with which it would be able to resolve the adjacent pairs of locators.

For example, during a first pattern, all locators of a target object 120 may be simultaneously emitting light. The imaging device 110 captures an image of the target object 120 and transmits the image to the pattern controller 130. The pattern controller 130 receives the image and analyzes the image to determine the resolution value. If the resolution value determined by the pattern controller 130 indicates that pattern controller 130 cannot resolve an adjacent pair of locators, the pattern controller 130 may select a second pattern in which only a subset of the locators, in any particular area, of the target device 120 emit light. The pattern controller 130 then generates emission instructions for this pattern and transmits the emission instructions to the target object 120.

Figure 2:
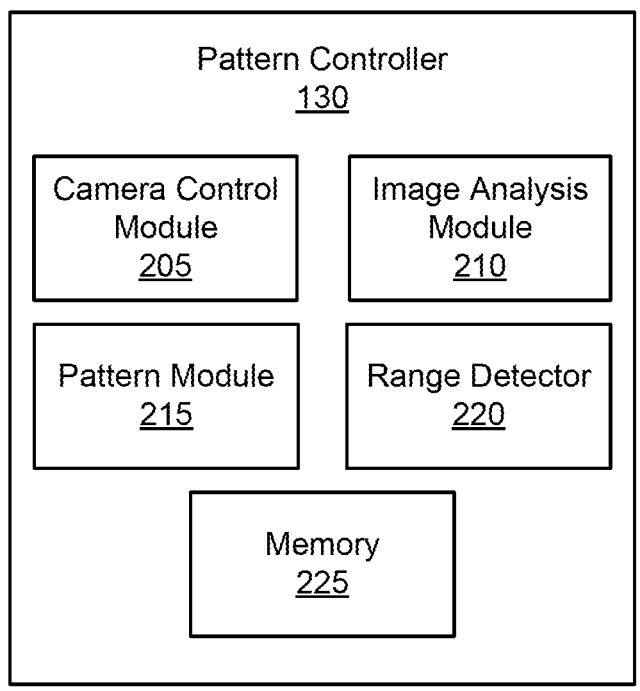
FIG. 2 is a block diagram of a pattern controller of FIG. 1, in accordance with an embodiment.

FIG. 2 is a block diagram of the pattern controller 130 for use in a coded tracking system such as the coded tracking system 100 of FIG. 1, in accordance with an embodiment. The pattern controller 130 includes a camera control module 205, an image analysis module 210, a pattern module 215, a range detector 220, and a memory 225. FIG. 2 shows merely one example and in alternative embodiments not shown, additional and/or different modules can be included in the pattern controller 130. Likewise, functions performed by different modules in the pattern controller 130 may differ in different embodiments.

The camera control module 205 is configured to generate instructions for controlling the imaging device 110. As described with respect to FIG. 1, the imaging device 110 may receive one or more calibration parameters from the pattern controller 130 to adjust one or more imaging parameters (e.g., focal length, focus, frame rate, ISO, sensor temperature, shutter speed, aperture, etc.). These calibration parameters may be generated by the camera control module 205. The camera control module 205 may set the parameters based on the pattern selected by the pattern module 215. For example, if the pattern module 215 adjusts the speed at which the controllable locators flash (e.g., if rather than having all locators flash simultaneously during one emission period, two different subsets flash at different times during the same emission period), the camera control module 205 may instruct the imaging device 110 to increase its frame rate to ensure that all flashes are captured. The frame rate may be set high enough to ensure that the flashes by the target object 120 emitting under a given pattern are captured. Alternatively, the frame rate of the imaging device 110 may be synchronized with the pattern of the target object 120, so that every time the target object 120 emits a pattern, the imaging device 110 captures an image or data set of the target object 120.

In some embodiments, rather than, or in addition to, controlling the locators on the target object 120, the pattern controller 130 may improve tracking by using camera control module 205 to request changes to the imaging parameters. For example, if the locators appears too bright in the images captured by the imaging device 110 and received by the camera control module 205, the camera control module may generate an instruction for the imaging device 110 to decrease the shutter speed. Thus, the system 100 can dynamically control the imaging of the target device 120 based on the range of the target device 120 by adjusting properties of the imaging device 110, the locators on the target device 120, or both.

The image analysis module 210 analyzes the images received from the imaging device 110. The image analysis module 210 may determine a resolution value for an adjacent pair of locators on the target object 120. The resolution value is indicative of the image analysis module 210 or another controller being able to resolve the adjacent pair of locators as two separate sources. To determine a resolution value, the image analysis module 210 may first calculate the centers of each of the pair of locators, and then estimate the error in the calculation. The image analysis module 210 may determine the error by comparing the captured image or the calculated centers of the locators to the known locations of the adjacent locators on the target object 120. Alternatively, or in addition, the image analysis module 210 may analyze the size of the adjacent locators in the captured images and/or the amount of overlap or relative image-space proximity between the collected data and images of the adjacent locators to determine the resolution value. In some embodiments, some or all of the image analysis module 210 may reside in the imaging device 110. For example, the imaging device 110 may derive data from captured images, such as the locations of the centroids of the locators on the target object 120, and transmit this data to the image analysis module 120 in lieu of or in addition to the images.

A resolution value of 1 may indicate that the image analysis module 210 can fully resolve the adjacent pair of locators as two separate sources and locate the center of the locators. A resolution value of 0 may indicate that the image analysis module 210 cannot distinguish between the adjacent pair of locators, i.e., they appear in the image as a single locator. Resolution values between 0 and 1 may indicate that the image analysis module 210 can distinguish between the adjacent pair of locators, but not with 100% certainty that it has correctly identified each pair of locators. For example, the image analysis module 210 may have a degree of uncertainty that it has correctly distinguished between the locators, or a degree of uncertainty that it has accurately located the center of each locator on the target object 120. A resolution value greater than 1 may indicate that the images of the adjacent locators are separated beyond a given amount, so that if the adjacent locators were closer together, the image analysis module 210 could still distinguish them and locate their centers with certainty. For resolution values greater than 1, the resolution value may be based on the apparent distance between the centers of the locators, or the edges of the locators.

According to this exemplary scale of resolution values, a resolution value at or around 1 may be considered optimal. A lower resolution value would reflect uncertainty in the positions of the locators. A higher resolution value would indicate that more data could be obtained to perform more accurate tracking; as noted above, a greater number of distinct locators leads to more accurate tracking. This approach would also allow a system to optimize performance for both near/far ranges, and potentially with different apparent image sizes of the locators. In other embodiments, a resolution value lower than 1 may be optimal. In this case, a higher degree of uncertainty would be tolerated in exchange for more data. In other embodiments, a resolution value greater than 1 may be optimal. In this case, the risk of any uncertainty may be great enough that a buffer is built in to avoid it, for example, if the target object 120 may be subjected to sudden movements that would cause the resolution value to suddenly drop. The above-described resolution value scale is merely exemplary, and any other scale for resolution values may be used.

In some embodiments, the image analysis module 210 may determine a resolution value for each adjacent pair of locators on the target object 120 that are concurrently emitting. In other embodiments, the image analysis module 210 may determine a resolution value for a particular subset of adjacent pairs of locators. For example, the image analysis module 210 may identify one or more pairs of adjacent locators based on, e.g., an initial analysis of the image, an analysis of a previous image, or the orientation of the target object 120. The identified pairs may be expected to be representative of all (or most) adjacent pairs, or may be expected to have the lowest resolution values. The image analysis module 210 may select one of the resolution values of the set of adjacent pairs of locators. For example, the image analysis module 210 may select a median resolution value, a minimum resolution value, a maximum resolution value. The image analysis module 210 may alternatively or additionally compute one or more metrics based on a set of resolution values, such as an average resolution value, a standard deviation of the resolution values, or a number or ratio of resolution values above or below a given threshold. The image analysis module 210 may alternatively or additionally compute a projected resolution value based on the prior resolution values, the direction of motion of the target object 120, a predicted motion of the target object, and/or other factors.

The resolution value(s) and/or the one or more computed metrics may be used by the pattern module 215 to select a pattern. For example, the image analysis module 210 may be configured to calculate a single resolution value or resolution value metric or prediction that is always passed to the pattern module 215. Alternatively, the image analysis module 210 or pattern module 215 may plug multiple resolution values, metrics, or predictions into a formula or machine learning algorithm to produce a metric that is used to select a pattern. The image analysis module 210 may provide different values or metrics in different situations. For example, if the projected resolution values have been accurate, or if the target object 120 is moving a lot, the image analysis module 210 may use the projected resolution value. If the resolution values of different sets of adjacent locators have little variation, the image analysis module 210 may provide an average or median resolution value. If the resolution values of different sets of adjacent locators have greater variation, the image analysis module 210 may provide the minimum resolution value, or both the minimum and maximum resolution values. If the resolution values vary between different areas of the target object 120, the image analysis module may provide a resolution value for each area.

In some embodiments, the image analysis module 210 may determine a resolution value based on more than one image captured by the imaging device 110. For example, a pattern may include multiple flashes of the locators, e.g., when during one emission period, one subset of locators emits light at a first time, and a second subset of locators emits light at a different time. In this example, the imaging device 110 may capture an image of each subset, and the image analysis module 210 analyzes both of the images. The image analysis module 210 may identify the locations of the locators in each image, and then combine the locations of the locators to determine the position of the target object 120. In addition, the image analysis module 210 may determine two different resolution values, one for each image, and combine them (e.g., by taking an average), or select one of the resolution values.

In some embodiments, the image analysis module 210 may not determine a resolution value for each emission period. The image analysis module 210 may first determine whether the target object 120 has moved, or whether the target object 120 has moved more than a threshold amount (either a threshold change in distance from the imaging device 110 or a threshold change in orientation). Upon determining that the target object 120 has moved by more than a threshold amount, the image analysis module 120 may determine the resolution value. Alternatively, or in addition, the image analysis module 210 may only determine a resolution value after a certain number of cycles. In some embodiments, the image analysis module 210 may determine how often to determine the resolution value based on how rapidly the resolution value is changing.

In some embodiments, the image analysis module 210 may also determine the position of the target object 120 based on an image or images received from the camera control module 205, and in particular, based on the locations of the controllable locators in the image. The position of the target object 120 may describe the position of the target object 120 in space relative to the imaging device 110 or another feature (e.g., relative to one or more walls, the floor, one or more other tracked objects, a set of axes). The position of the target object 120 may alternatively or additionally describe the orientation of the target object 120 relative to a set of axes or features.

The pattern module 215 determines a pattern based at least in part on the resolution value (or a set of resolution values and/or one or more computed metrics) received from the image analysis module 210. The pattern module 215 incorporates this pattern into emission instructions for transmission to the target object 120. If the resolution value is low, the pattern module 215 determines the second pattern to improve the likelihood that the image analysis module 210 can resolve between individual locators of the target object 120. A pattern can incorporate any of the parameters described above. For example, emission instructions for a pattern may specify which locators are on (e.g., all locators on, or a subset of locators on) or specify a modulation pattern (i.e., having different locators on at different times). Emission instructions for a pattern may specify that locators emit at a particular wavelength, or that different locators emit at different wavelengths. Emission instructions for a pattern may specify that locators, or sets of locators, emit at a given emissivity or emissivities. Emission instructions may also describe solid-angle conditions for the locators. Solid-angle conditions can be used to adjust a source's pattern from a wide-diffuse emission cone to a narrow, confined cone, or to set sources to have asymmetric distributions which can be used to differentiate the sources between different cameras (e.g., light emitted by a source can be angled so that it can be imaged by one camera in one position but not a second camera in a different position). The emission instructions may include instructions related to one or multiple parameters. For example, the emission instructions may combine multiple parameters (e.g., modulation and wavelength, by specifying that a first set of locators emit at one wavelength, and a second set of locators emit at a different time and at a different wavelength).

For a simple case in which the target object 120 has two patterns (e.g., Pattern A in which all locators emit, and Pattern B in which a subset of the locators emit; or Pattern A in which the locators have a high emissivity, and Pattern B in which the locators have a low emissivity), the pattern module 215 may compare the resolution value to a threshold number for the current pattern. In particular, if the target object 120 is emitting according to Pattern A, and the resolution value falls below a low threshold number associated with Pattern A, the pattern module 215 may select Pattern B to be the second pattern. This may improve the resolution value, and reduce any errors in the position tracking. If the target object is emitting according to Pattern B, and the resolution value is high, e.g., above a high threshold number associated with Pattern B, the pattern module 215 may select Pattern A to be the second pattern. Changing to Pattern A may reduce the resolution value, but because the resolution value is so high, it should not reduce it to an undesirable extent; it may also enhance the position tracking by providing more data (if Pattern A has more locators emitting than Pattern B) or stronger signals (if Pattern A has higher signal-to-noise ratio, or more locators are identified, than Pattern B).

As another example, the target object 120 may have a range of target patterns available in which one or more pattern characteristics can be tuned. For example, a range in the number of locators simultaneously may be available (e.g., 25% of the locators, 50% of the locators, 75% of the locators, or 100% of the locators), or the locators may be capable of emitting over a range of emissivities or solid-angle conditions. In these examples, the pattern module 215 may compare the determined resolution value to a range of resolution values, the range of resolution values having an upper value and a lower value. If the determined resolution value falls below the lower value, the pattern module 215 may select as the second pattern the next available pattern down in the range of patterns (e.g., if the current pattern is 75% locators emitting, select the pattern with 50% of the locators emitting). This may improve the resolution value, and reduce any errors in the position tracking. If the determined resolution value falls above the upper value, the pattern module 215 may as the second pattern the next available pattern up the range of patterns (e.g., if the current pattern is 75% locators emitting, select the pattern with 100% of the locators emitting). This may reduce the resolution value, but not to an undesirable extent, and may enhance the position tracking. If the determined resolution value falls between the upper and lower value, the pattern module 215 selects the current pattern as the second pattern (i.e., the pattern module 215 does not change the pattern).

Additionally, the pattern module 215 can adjust one or more characteristics if, e.g., multiple pattern characteristics are available to change. The pattern module 215 make multiple adjustments until the desired range of resolution values is reached. For example, if the determined resolution value is below the lower value, the pattern module 215 may first adjust the number of locators emitting simultaneously, so that less are emitting simultaneously. The image analysis module 210 may then determine a new resolution value and find that it is still below the lower value. The pattern module 215 may then adjust the emissivity of the locators, so that they are less bright. The image analysis module 210 may then determine a new resolution value and compare it to the range of resolution values. The pattern module 215 may continue adjusting the characteristics (e.g., number of locators, solid-angle control, number of locators, emissivity, etc.) until the determined resolution value falls within the range of resolution values. Alternatively, the pattern module 215 may adjust some or all characteristics in each step (e.g., decrease both the emissivity and number of locators in each step) until the determined resolution value falls within the range of resolution values. If the pattern module 215 is lowering the emissivity, it may need to stop lowering the emissivity or raise the emissivity if the locators become too weak.

The image analysis module 210 and the pattern module 215 may coordinate to obtain the range of resolution values during a calibration process. During the calibration process, the pattern module 215 may learn the range of resolution values within which the image analysis module 210 can resolve between individual locators at less than a threshold level of error. The pattern module 215 may determine the range by testing different patterns, measuring the resolution values for the patterns with image analysis 210, and receiving or determining a level of positioning error. The pattern module 215 may also instruct the target object 120 to produce different patterns at different conditions, e.g., at different locations in a room, or at different distances relative to the imaging device 110. The pattern controller 130, target object 120, and/or imaging device 110 may provide instructions to a user to perform steps in the calibration process, such as setting up the system and moving the target object 120 to various positions. Once the pattern module 215 has determined the range of resolution values, the pattern module 215 may store this range of resolution values in the memory 225.

As another example, the pattern module 215 may consult an update database to identify the second pattern, or the "update" pattern, which the target object 120 updates to upon receiving emission instructions from the pattern module 215. As one example, the pattern module 215 retrieve data from a data structure that includes fields for a current pattern, a current resolution value, and an update pattern. The current pattern describes the pattern at which the current resolution value was measured. The update pattern identifies the pattern at which the resolution value is optimized, and the target object 120 should update to. Using this database, the pattern module 215 may use the current pattern and current resolution value to look up the update pattern in the update database, and then select the update pattern for the second pattern.

This update database may be populated during the calibration process and/or with historical data. For example, as discussed above, during the calibration process, the pattern controller 130 may also test different patterns, and may test patterns at different conditions, e.g., at different locations or distances relative to the imaging device 110. With this data, the pattern module 215 may populate the database that relates current patterns and current resolution values to update patterns. The pattern module 215 may store additional historical data during use of the tracking system 100 to supplement the update database, or the pattern module 215 may populate this data structure during use if it was not populated during a calibration process.

As another example, the pattern module 215 may use a formula or set of formulas to describe the relationship between the current pattern, the current resolution value, and an update pattern. The formula(s) may take as inputs the current resolution and one or more numbers describing characteristics of the current pattern, e.g., number of locators, distance between locators, emissivity of locators, etc. The formula(s) may return characteristics for the update pattern, e.g., number of locators, distance between locators, emissivity of locators, etc. The second pattern may be selected in accordance with the update pattern characteristics. The formula(s) may be part of the software controlling the pattern module 215, or the formula(s) may be created or adjusted according to calibration data and/or historical data, obtained as described above.

As another example, the pattern module 215 may use additional information generated by the image analysis module 210 to generate emission instructions. For example, the image analysis module 210 may provide geometry and orientation information describing the target object 120 that can be used to generate a pattern. The geometry and orientation of the target object 120 may cause the images from the imaging device 110 to show some locators on certain areas of the target object 120 to appear closer together than other areas of the target object 120. For example, the target object 120 may be a cube with evenly distributed locators on all of its faces. If this cube is oriented with its front face at a slight angle, such that both the front face an a side face of the cube are visible to the imaging device 110, the locators on the side face of the cube may appear, in an image, much closer together than the locators on the front face. In this case, the resolution value of the lights on the front face may be higher than the resolution value of the lights on the side face. Accordingly, the pattern module 215 may set a first pattern for the side face based on its resolution value, and a different pattern for the front face based on its resolution value. The pattern module 215 can perform a similar technique on target objects 120 with more complicated geometries. For more complicated geometries, greater control over the locators is useful to enable more customized patterns. For example, the locators on the target object 120 may each be individually controllable. Alternatively, a number of different subsets of the locators may be controllable, with subsets evenly distributed throughout the target object 120, with subsets based on regions of the target object 120, or a combination of the regional and wider area subsets.

In some embodiments, the pattern module 215 may also use IMU tracking data generated by an inertial measurement unit of the target object 120 and received from the target unit 120 to determine the second pattern. IMU tracking and the gathering of IMU tracking data are described further with respect to FIG. 6. After determining the second pattern, the pattern module 215 provides emission instructions to the target object 120 for its controllable locators to emit light according to the second pattern. The pattern controller 130 may communicate with the target object 120 through a wireless or wired connection. For example, the pattern controller 130 and target object 120 may communicate using Wi-Fi, BLUETOOTH, or other wireless communications protocol. In other embodiments, the pattern controller 130 may be integrated into the target object 120.

A range detector 220 may be included in the pattern controller 130 to calculate the distance between the imaging device 110 and the target object 120. The range detector 220 may determine the range based on one or more images received from the imaging device 110 or based on another mechanism, such as proximity sensing or range finding hardware integrated into the imaging device 110 and/or the target object 120. In other embodiments, range information may be received from an external source. In some embodiments, a local area including the target object 120 is divided into a plurality of resolution zones. Each resolution zone is associated with a different range of distances from the imaging device 110, and each resolution zone is associated with a different pattern. After the range detector 220 determines the distance between the imaging device 110 and the target object 120, the pattern module 215 compares the determined distance to the different ranges to determine which range the target object 120 falls in, and selects the resolution zone in which the determined distance falls. The pattern module 215 then may select a pattern that corresponds to the selected resolution zone. In some embodiments, the pattern module 215 may further receive or determine the orientation of the target object 120 relative to the imaging device 110, determine which locators on the target object 120 to utilize in future imaging, and then select a pattern based on both the distance between the imaging device 110 and the target object 120 and the orientation of the target object 120 relative to the imaging device 110.

The range detector 220 may be used in coordination with the image analysis module 210 for selecting the pattern. For example, the range detector 220 may find a resolution value faster than the image analysis module 210. In this case, the range detector 220 can be used to provide more rapid updates to the pattern when the target object 120 is moving quickly, and the image analysis module 210 can be used when the target object is steadier. As another example, if the range of the target object 120 changes abruptly, or when the target object 120 is first turned on, the range detector 220 can provide a first resolution value to the pattern module 215 so that it can roughly set an initial pattern, and, once this initial pattern is set, the image analysis module 210 can be used to provide subsequent resolution values to the pattern module 215 for finer tuning of the pattern.

In some embodiments, the pattern module 215 may determine the resolution value based on the distance between the imaging device 110 and the target object 120. The range detector 220 may determine a resolution value based on the determined range, e.g., using the resolution zones described above. The range detector 220 may be calibrated so that different ranges are associated with different resolution values.

The memory 225 may store a set of instructions for the camera control module 205, image analysis module 210, pattern module 215, and range detector 220. The memory 225 may store any calibration data or historical data described with respect to FIG. 1. The memory 225 may store any information received by the pattern controller 130, such as images received from the imaging device 110. The memory 225 may store any data generated by the camera control module 205, image analysis module 210, pattern module 215, and/or range detector 220. For example, the memory 225 may store the image analysis results generated by the image analysis module 210 or the range determined by range detector 220. The memory 225 may further store any data or instructions communicated by pattern controller 130, such as the imaging device instructions output by the camera control module 205 or the emission instructions output by the pattern module 215.

Figure 3:
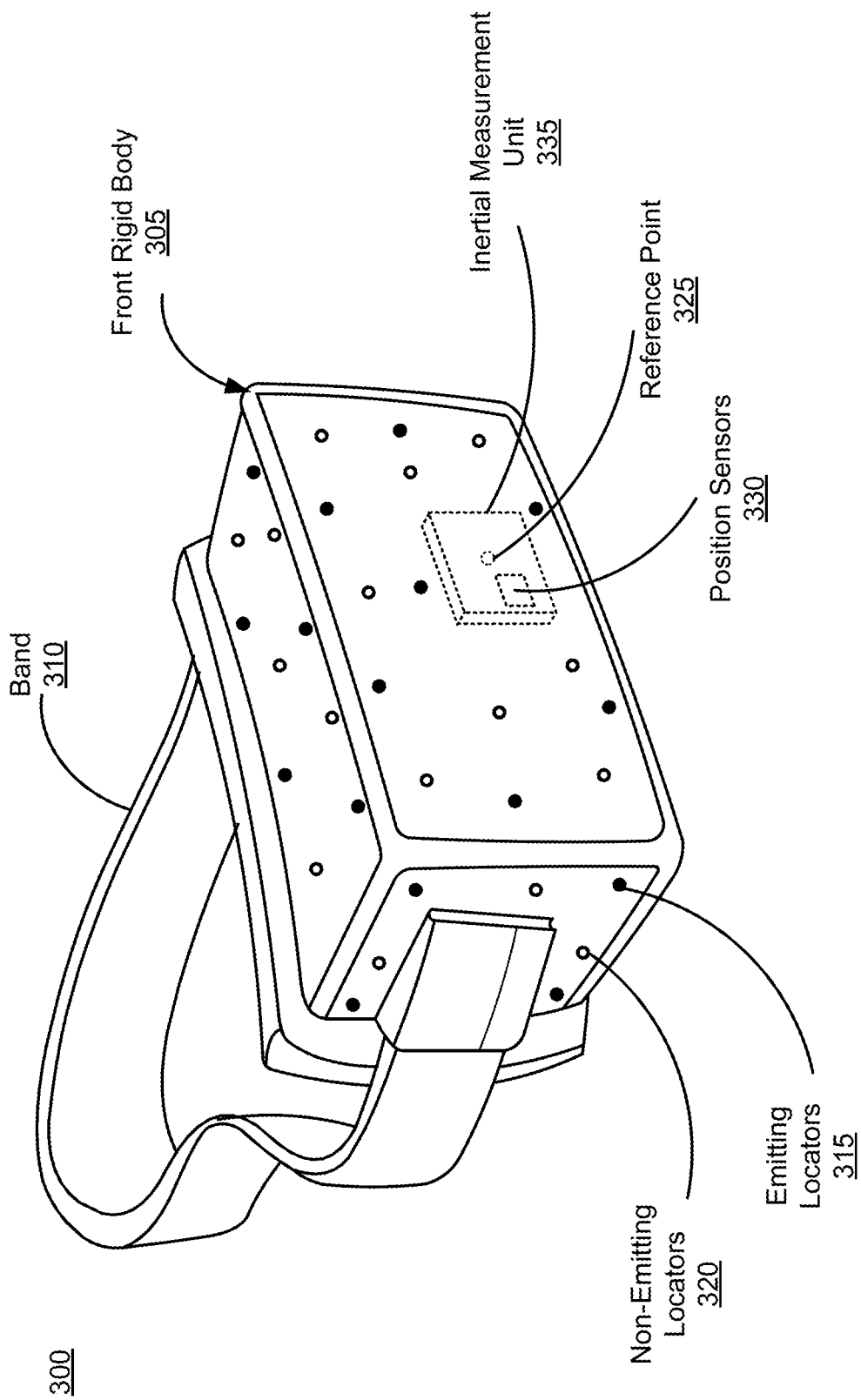
FIG. 3 is a diagram of a head-mounted display (HMD) with controllable light sources emitting in a first pattern, in accordance with an embodiment.

FIG. 3 is a diagram of a head-mounted display (HMD) 300 with controllable locators emitting in a first pattern, in accordance with an embodiment. The HMD 300 is one example of a target object 120. The HMD 300 includes a front rigid body 305 and a band 310. The front rigid body includes emitting locators 315 and non-emitting locators 320, a reference point 325, one or more position sensors 330, an inertial measurement unit (IMU) 335. The reference point 325, position sensors 330, and IMU 335 are described with respect to FIG. 6. The emitting locators 315 and the non-emitting locators 320 are controllable locators that can be set to emit light according to a pattern. The emitting locators 315 are locators that, according to the emission instructions, are emitting light, and the non-emitting locators 320 are locators that, according to the emission instructions, are not emitting light. In the embodiment shown by FIG. 3, the position sensors 330 are located within the IMU 335, and neither the IMU 335 nor the position sensors 330 are visible to a user. The front rigid body 305 may also include an electronic display (not shown in FIG. 3) that is visible to a user wearing the HMD. In some embodiments, the HMD 300 may act as a virtual reality (VR) headset, an augmented reality (AR) headset, a mixed reality (MR) headset, or some combination thereof. In embodiments that describe AR system environment, the HMD 300 augments views of a physical, real-world environment with computer-generated elements (e.g., images, video, sound, etc.). For example, one or more portions of the HMD 300 may be at least partially transparent. In embodiments that describe MR system environments, the HMD 300 merges views of physical, real-word environment with virtual environment to produce new environments and visualizations where physical and digital objects co-exist and interact in real time.

The emitting locators 315 and the non-emitting locators 320 are in communication with one or more controllers which provide signals instructing the emitting locators 315 to emit light and the non-emitting locators 320 to not emit light. The controllers may provide instructions to emit light according to one or more characteristics (e.g., emit light at certain times or emit light with a particular emissivity). For example, emitting locators 315 may be operatively connected so that they all emit simultaneously, and non-emitting locators 320 may be operatively connected so that they may all be able to emit simultaneously when instructed. According to the example pattern shown in FIG. 3, emitting locators 315 may be controlled by a first controller, and non-emitting locators 310 may be controlled by a second controller. According to a first pattern, the first controller provides a first signal that causes the emitting locators 315 emit light and, simultaneously, the second controller provides a second signal that instructs the non-emitting locators 320 to emit light (or equivalently, the second controller may provide no signal to the non-emitting locators 320, so they do not emit light).

According to a second pattern, both the first controller and the second controller may provide a signal that causes both the emitting locators 315 and the non-emitting locators 320 to emit light, i.e., causes all of the locators 315 and 320 to become emitting locators. This second pattern is shown in FIG. 4.

Figure 4:
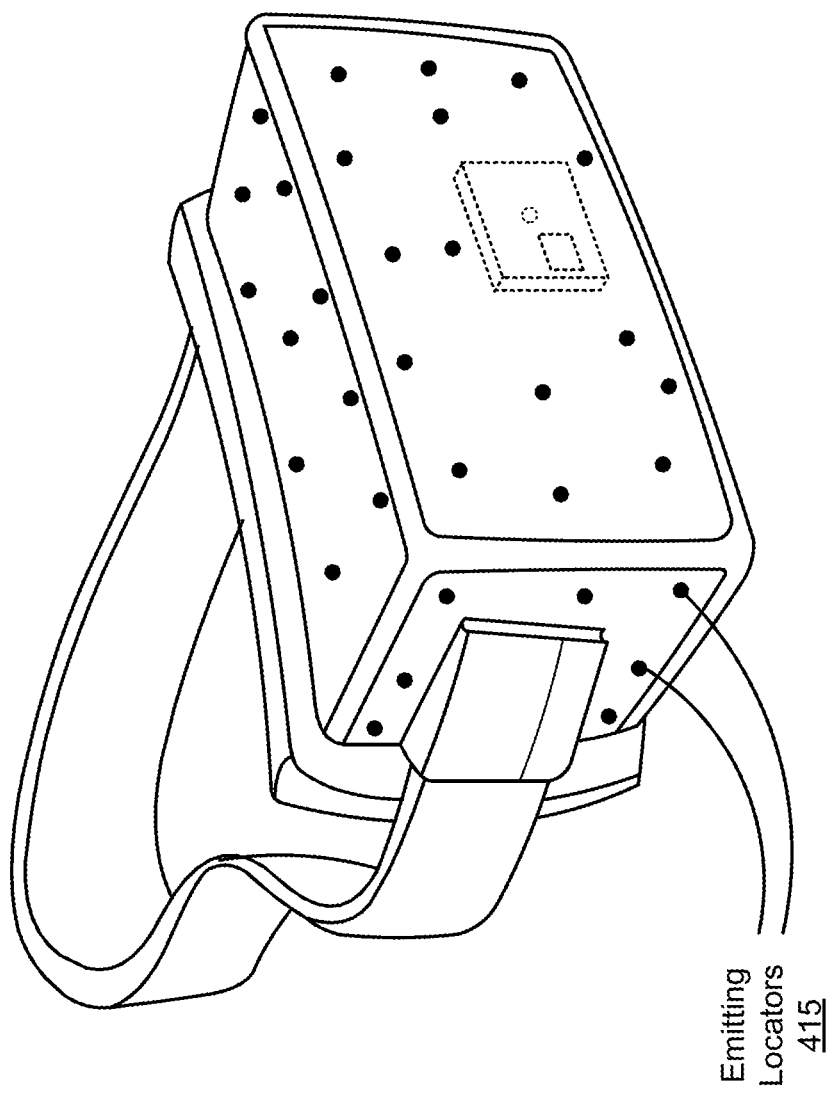
FIG. 4 is a diagram of an HMD with controllable light sources emitting in a second pattern, in accordance with an embodiment.

FIG. 4 is a diagram of an HMD with controllable locators emitting in a second pattern, in accordance with an embodiment. In FIG. 4, all of the locators 415 are emitting locators. As discussed above with respect to FIGS. 1 and 2, the locators 415 can be configured to emit in any suitable pattern to allow the pattern controller 130 to resolve the locators 415.

Figure 5:
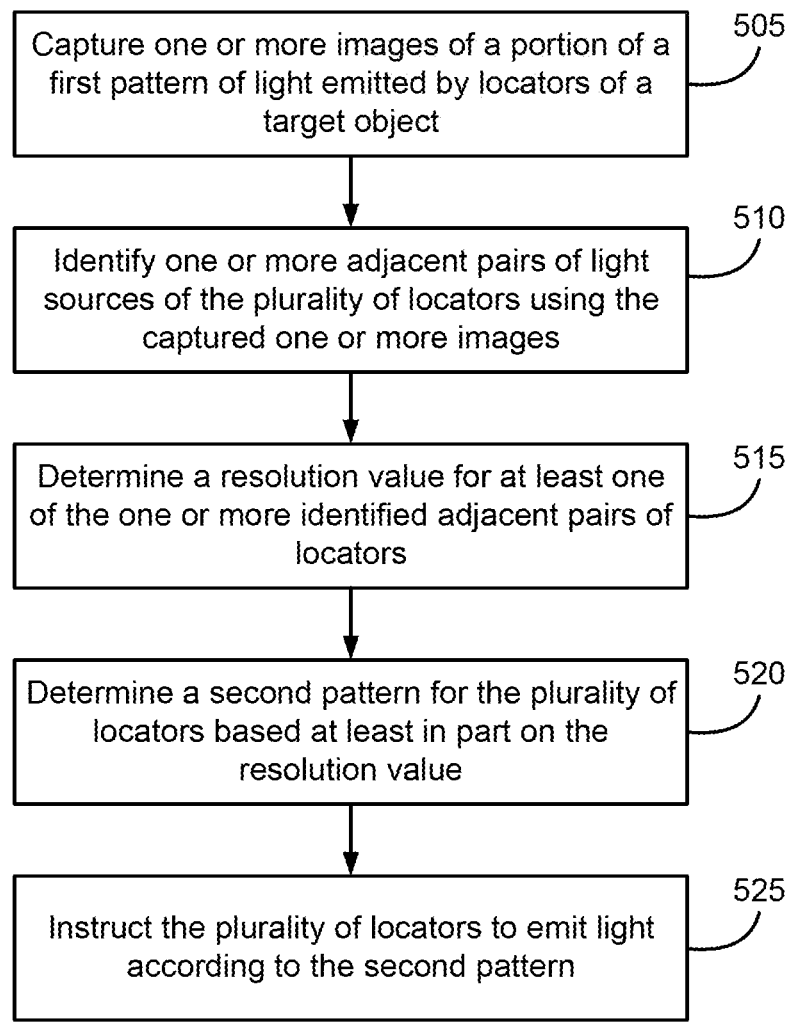
FIG. 5 is a flow chart illustrating a process for adjusting an emission pattern of a target object, in accordance with an embodiment.

FIG. 5 is a flow chart illustrating a process 500 for adjusting the emission pattern of a target object, in accordance with an embodiment. The process 500 may be performed by a coded tracking system 100. Other entities (e.g., a target object 120 or a console) may perform some or all of the steps in the process in other embodiments. For example, the some or all of the coded tracking system 100 may be integrated into a HMD system (e.g., as discussed in detail in FIG. 6). Likewise, embodiments may include different and/or additional steps, or perform the steps in different orders.

The coded tracking system 100 captures 505 one or more images (e.g., via an imaging device 110) of a portion of a first pattern of light emitted by locators of a target object 120 (e.g., a HMD, a hand controller, etc.). The coded tracking system 100 may capture multiple different images of the target object 120, e.g., using cameras in different locations, and/or capturing multiple images from a single viewpoint.

The coded tracking system 100 identifies 510 one or more adjacent pairs of locators of the plurality of locators, such as locators 315 or 415, using the captured one or more images. The locators are located in specific positions on the target object 120 relative to one another and relative to a specific reference point on the target object 120, and based on information describing the geometry of the locators on the target object 120, the coded tracking system (e.g., the pattern controller 130) can select one or more specific pairs of adjacent locators. Alternatively, the pattern controller 130 may select all adjacent pair of locators concurrently emitting on the target object 120. As another example, the pattern controller 130 may identify one or more pairs of adjacent locators based on, e.g., an initial analysis of the image, an analysis of a previous image, the orientation of the target object 120, that are expected to be representative of all (or most) adjacent pairs, or that are expected to have the lowest resolution values.

The coded tracking system 100 determines 505 a resolution value for at least one of the one or more identified adjacent pairs of locators. The resolution value is indicative of the pattern controller 130 being able to resolve the adjacent pair of locators as two separate locators. The resolution value may also reflect the ability of the pattern controller 130 to identify the centers of each locator. To determine a resolution value, the coded tracking system 100 (e.g., pattern controller 130) may first calculate the centers of each of the pair of locators, and then estimate the error in the calculation. The pattern controller 130 may determine the error by comparing the calculated centers of the locators to the known relative locations of the adjacent locators on the target object 120. The pattern controller 130 may analyze the size of the adjacent locators in the captured images and/or the amount of overlap between the images of the adjacent locators. If the pattern controller 130 has identified multiple pairs of adjacent locators, the pattern controller 130 may select one of a maximum resolution value, a minimum resolution value, an average resolution value, a median resolution value, etc. Determining a resolution value is described in further detail with respect to FIG. 2.

The coded tracking system 100 determines 520 a second pattern for the plurality of locators based at least in part on the resolution value. For example, if the resolution value is high, the pattern controller 130 may select a second pattern that provides greater locator density. If the resolution value is low, the pattern controller 130 may select a second pattern that provides lower locator density but reduces error and, thus, improve the resolution value. The selected pattern may depend on the technical capabilities of the target object 120. For example, the second pattern may only vary the emissivity of the locators if the target object 120 is capable of changing its locators' emissivity. Determining the second pattern is described in further detail with respect to FIGS. 1-3.

The coded tracking system 100 provides emission instructions that instruct 525 the plurality of locators to emit light according to the second pattern. For example, the pattern controller 130 may generate the emission instructions based on the determined second pattern. The pattern controller 130 may transmit emission instructions to the target object 120 that include data that describes one or more characteristics of the second pattern. Alternatively, if the target object 120 is configured to emit light according to one of several preset patterns, the emission instructions may include data identifying one of the preset patterns. In other embodiments, the pattern controller 130 is located in the target object 120, and the pattern controller 130 can send emission instructions directly to the plurality of locators. Implementing the pattern on the target object 120 is described in further detail with respect to FIG. 3.

Figure 6:
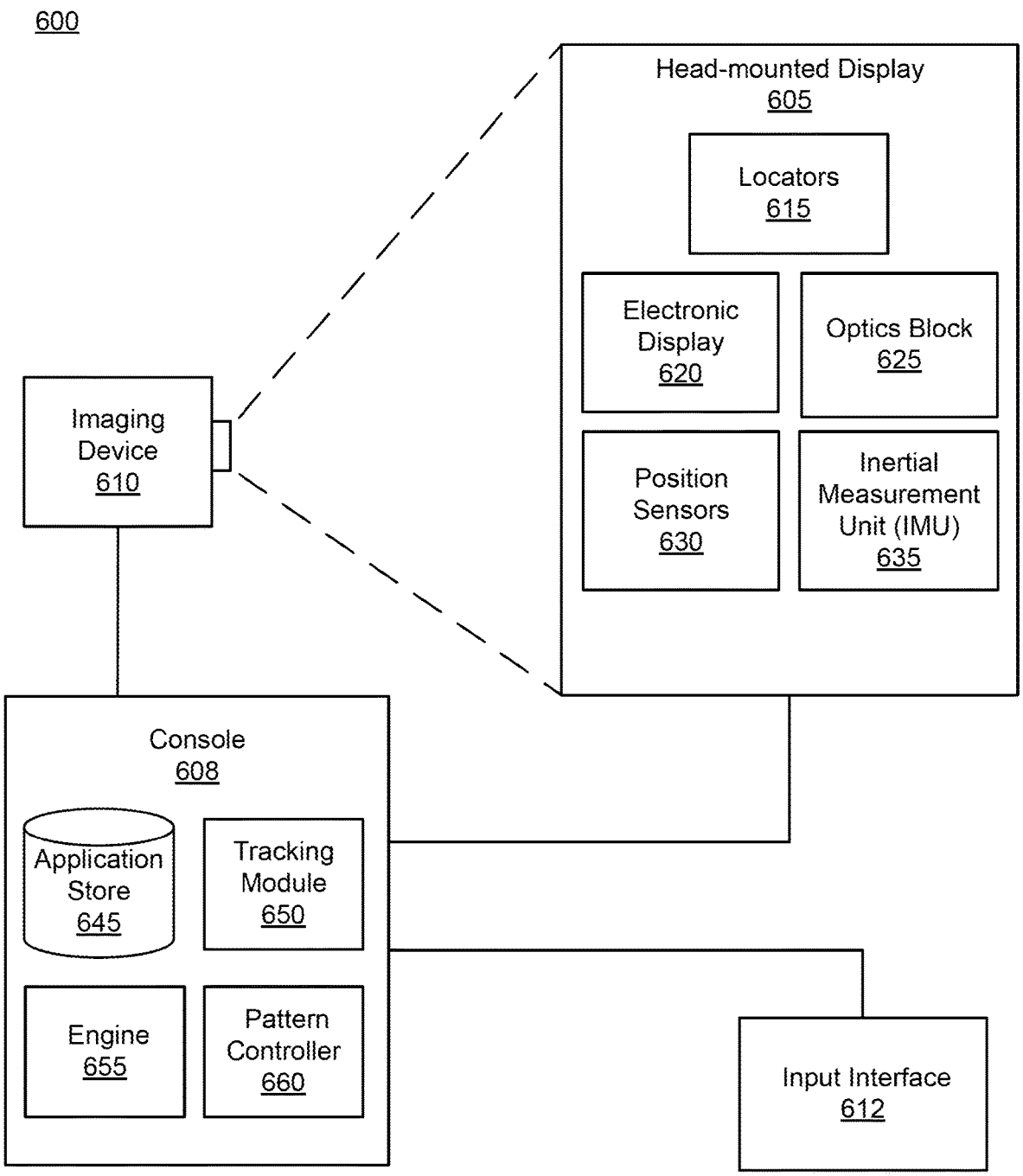
FIG. 6 is a block diagram of an HMD system in which the coded tracking system of FIG. 1 operates, in accordance with an embodiment.

FIG. 6 is a block diagram of an HMD system 600 in which the coded tracking system 100 of FIG. 1 operates, in accordance with an embodiment. The system 600 shown by FIG. 6 comprises a HMD 605, an imaging device 610, and an input interface 612 that are each coupled to a console 608. While FIG. 6 shows an example system 600 including one HMD 605, one imaging device 610, and one input interface 612, in other embodiments any number of these components may be included in the system 600. For example, there may be multiple HMDs 605 each having an associated input interface 612 and being monitored by one or more imaging devices 610, with each HMD 605, input interface 612, and imaging devices 610 communicating with the console 608. In alternative configurations, different and/or additional components may be included in the system 600. Similarly, functionality of one or more of the components can be distributed among the components in a different manner than is described here. For example, some or all of the functionality of the console 608 may be contained within the HMD 605. The system 600 may operate in a VR system environment, an AR system environment, a MR system environment, or some combination thereof.

The HMD 605 presents content to a user. In some embodiments, the HMD 605 is the HMD 300. Examples of content presented by the HMD 605 include one or more images, video, audio, or some combination thereof. In some embodiments, audio is presented via an external device (e.g., speakers and/or headphones) that receives audio information from the HMD 605, the console 608, or both, and presents audio data based on the audio information. In some embodiments, the HMD 605 may present VR, AR, MR, or some combination thereof to a user. In the AR and/or MR embodiments, the HMD 605 may augment views of a physical, real-world environment with computer-generated elements (e.g., images, video, sound, etc.).

The HMD 605 includes one or more locators 615, an electronic display 620, an optics block 625, one or more position sensors 630, and an inertial measurement unit (IMU) 635. Some embodiments of the HMD 605 have different components than those described here. Similarly, the functions can be distributed among other components in the system 600 in a different manner than is described here.

The electronic display 620 displays images to the user in accordance with data received from the console 608. In various embodiments, the electronic display 425 comprises a single electronic display or multiple electronic displays (e.g., a display for each eye of a user). Examples of the electronic display 620 include: a liquid crystal display (LCD), an organic light emitting diode (OLED) display, an active-matrix organic light-emitting diode display (AMO-LED), some other display, or some combination thereof.

The optics block 625 magnifies image light received from the electronic display 620, corrects optical errors associated with the image light, and presents the corrected image light to a user of the HMD 605. In various embodiments, the optics block 625 includes one or more optical elements. Example optical elements included in the optics block 625 include: an aperture, a Fresnel lens, a convex lens, a concave lens, a filter, a reflecting surface, or any other suitable optical element that affects image light. Moreover, the optics block 625 may include combinations of different optical elements. In some embodiments, one or more of the optical elements in the optics block 625 may have one or more coatings, such as partially reflective or anti-reflective coatings.

The locators 615 are an embodiment of the locators described with respect to target object 120 in FIG. 1. The locators 615 are located in specific positions on the HMD 605 relative to one another and relative to a specific reference point on the HMD 605, and are used to determine the position of the HMD. The locators 615 may be any controllable locators, such as the controllable locators described in detail with respect to FIGS. 1-4, or the locators 315, 320, and 415 shown in FIGS. 3 and 4.

The IMU 635 is an electronic device that generates IMU tracking data based on measurement signals received from one or more of the position sensors 630. A position sensor 630 generates one or more measurement signals in response to motion of the HMD 605. Examples of position sensors 630 include: one or more accelerometers, one or more gyroscopes, one or more magnetometers, another suitable type of sensor that detects motion, a type of sensor used for error correction of the IMU 635, or some combination thereof. The position sensors 330 may be located external to the IMU 635, internal to the IMU 635, or some combination thereof.

Based on the one or more measurement signals from one or more position sensors 630, the IMU 635 generates IMU tracking data indicating an estimated position of the HMD 605 relative to an initial position of the HMD 605. For example, the position sensors 630 include multiple accelerometers to measure translational motion (forward/back, up/down, left/right) and multiple gyroscopes to measure rotational motion (e.g., pitch, yaw, and roll). In some embodiments, the IMU 635 rapidly samples the measurement signals and calculates the estimated position of the HMD 605 from the sampled data. For example, the IMU 635 integrates the measurement signals received from the accelerometers over time to estimate a velocity vector and integrates the velocity vector over time to determine an estimated position of a reference point on the HMD 605. Alternatively, the IMU 635 provides the sampled measurement signals to the pattern controller 130, which determines the IMU tracking data. The reference point is a point that may be used to describe the position of the HMD 605. While the reference point may generally be defined as a point in space; however, in practice the reference point is defined as a point within the HMD 605 (e.g., a center of the IMU 635).

The IMU 635 receives one or more calibration parameters from the pattern controller 130 or another controller, such as a console. The one or more calibration parameters are used to maintain tracking of the HMD 605. Based on a received calibration parameter(s), the IMU 635 may adjust one or more IMU parameters (e.g., sample rate). In some embodiments, certain calibration parameters cause the IMU 635 to update an initial position of the reference point so it corresponds to a next calibrated position of the reference point. Updating the initial position of the reference point at the next calibrated position of the reference point helps reduce accumulated error associated with the determined estimated position. The accumulated error, also referred to as drift error, causes the estimated position of the reference point to "drift" away from the actual position of the reference point over time.

The imaging device 610 generates image tracking data in accordance with calibration parameters received from the console 608. Image tracking data includes one or more images showing observed positions of the locators 615 that are detectable by the imaging device 610, or data derived from captured images. The imaging device 610 is an embodiment of the imaging device 110 described in detail with respect to FIG. 1.

The input interface 612 is a device that allows a user to send action requests to the console 608. An action request is a request to perform a particular action. For example, an action request may be to start or end an application or to perform a particular action within the application. The input interface 612 may include one or more input devices. Example input devices include: a keyboard, a mouse, a game controller, or any other suitable device for receiving action requests and communicating the received action requests to the console 608. An action request received by the input interface 612 is communicated to the console 608, which performs an action corresponding to the action request. In some embodiments, the input interface 612 may provide haptic feedback to the user in accordance with instructions received from the console 608. For example, haptic feedback is provided when an action request is received, or the console 608 communicates instructions to the input interface 612 causing the input interface 612 to generate haptic feedback when the console 608 performs an action.

The input interface 612 may be another type of target object 120. Accordingly, the input interface 612 may have controllable locators, similar to locators 315, 320, 415, and 615, that can emit light according to two or more different patterns. The emitting pattern of the input interface 612 may be controlled by the console 608 or the HMD 605.

The console 608 provides content to the HMD 605 for presentation to the user in accordance with information received from one or more of: the imaging device 610, the HMD 605, the input interface 612, and the optics block 625. In the example shown in FIG. 6, the console 608 includes an application store 645, a tracking module 650, an engine 655, and a pattern controller 660. Some embodiments of the console 608 have different modules than those shown in FIG. 6. Similarly, the functions further described below may be distributed among components of the console 608 in a different manner than is described here.

The application store 645 stores one or more applications for execution by the console 608. An application is a group of instructions, that when executed by a processor, generates content for presentation to the user. Content generated by an application may be in response to inputs received from the user via movement of the HMD 605, the input interface 612, or the eye tracking unit included in the optics block 625. Examples of applications include: gaming applications, conferencing applications, video playback application, or other suitable applications.

The tracking module 650 determines positions of the HMD 605 to track the position of the HMD 605. Systems and method for tracking an HMD 605 are described in U.S. Pat. Nos. 9,524,580 and 9,600,925, incorporated herein by reference in their entireties. The tracking module 650 may calibrate the system 600 using one or more calibration parameters and may adjust one or more calibration parameters to reduce error in determination of the position of the HMD 605. For example, the tracking module 650 adjusts the focus of the imaging device 610 to obtain a more accurate position for observed locators on the HMD 605. Moreover, calibration performed by the tracking module 650 also accounts for information received from the IMU 635. Additionally, if tracking of the HMD 605 is lost (e.g., the imaging device 610 loses line of sight of at least a threshold number of the locators 615), the tracking module 650 re-calibrates some or all of the system 600.

The tracking module 650 tracks movements of the HMD 605 using image tracking data from the imaging device 610. The tracking module 650 determines positions of a reference point of the HMD 605 using observed locators from the image tracking data and a model of the HMD 605. The tracking module 650 also determines positions of a reference point of the HMD 605 using position information from the IMU tracking data. Additionally, in some embodiments, the tracking module 650 may use portions of the IMU tracking data, the image tracking data, or some combination thereof, to predict a future location of the HMD 605. The tracking module 605 provides the estimated or predicted future position of the HMD 605 to the engine 655 and/or the pattern controller 660.

The engine 655 executes applications within the system 600 and receives position information, acceleration information, velocity information, predicted future positions, or some combination thereof of the HMD 605 and the optics block 625 from the tracking module 650. Based on the received information, the engine 655 determines content to provide to the HMD 605 for presentation to the user. Additionally, the engine 655 performs an action within an application executing on the console 608 in response to an action request received from the input interface 612 and provides feedback to the user that the action was performed. The provided feedback may be visual or audible feedback via the HMD 605 or haptic feedback via the input interface 612.

The pattern controller 660 receives information from the imaging device 610 and/or the tracking module 650 to determine a pattern for the locators 615, or locators on another target object 120, such as input interface 612. The pattern controller 660 generates and outputs emission instructions describing the determined pattern. The pattern controller 660 may first determine a resolution value for the target object 120 based on the received images from the imaging device 610 and/or data received from the tracking module 650. Based on this resolution value, and based on the current pattern used by the target object, the pattern controller 660 determines a new pattern for the target object 120, and instructs the locators (e.g., locators 615) to emit according to the new pattern. The pattern controller 660 is an embodiment of the pattern controller 130 described in detail with respect to FIGS. 1-3.

In some embodiments, the system 600 may include multiple target objects 120 with controllable locators that are tracked by the tracking module 650 and pattern controller 660. For example, the system 600 may include multiple HMDs 605, multiple input interfaces 612, or a combination of one or more HMDs 605, input interfaces 612, or other target objects 120. In such embodiments, the pattern controller 660 may be configured to first identify the target objects within a range of the imaging device, and then determine a pattern for the controllable lights sources of each of the target objects' controllable locators. The pattern controller 660 then provides emission instructions to the target objects for each of their respective controllable locators to emit light according to the selected patterns.

The pattern controller 660 can distinguish the target objects based on one or more captured images of light emitted by the target objects according to the selected patterns. For example, the pattern controller 660 may select different patterns for two different target objects, and distinguish the target objects based on the patterns in the captured image(s). For example, two patterns may differ in at least one of wavelength of controllable locators, number of controllable locators that simultaneously emit light at any time, spatial distribution of controllable locators that emit light, and emissivity of controllable locators. Alternatively, if the geometries of two target objects are different, the pattern controller 660 may select the same pattern for both target objects and distinguish between them in a captured image or images based on the geometries of the captured light. In addition, the pattern controller 660 may determine the patterns for multiple target objects based at least in part on the target objects' respective resolution values, as described with respect to FIGS. 1, 2, and 5.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A system comprising:
   a plurality of locators configured to emit light according to one of a plurality of patterns;
   communications circuitry configured to receive emission instructions from a pattern controller, the emission instructions specifying one of the plurality of patterns and determined based on a resolution value for adjacent pairs of locators of the plurality of locators, the resolution value indicative of the pattern controller being able to resolve the adjacent pair of locators as two separate sources; and
   a controller configured to instruct at least a portion of the plurality of locators to emit light according to the one of the plurality of patterns specified by the emission instructions.

2. The system of claim 1, wherein the emission instructions describe an emission parameter for each of the plurality of locators, and the controller is configured to control the emission parameter of each of the plurality of locators according to the emission instructions.

3. The system of claim 2, wherein the controller is configured to individually control each of the plurality of locators to emit light according to the respective emission parameter for the locator.

4. The system of claim 1, wherein the emission instructions describe a first emission parameter for a first portion of the plurality of locators and a second emission parameter for a second portion of the plurality of locators.

5. The system of claim 4, wherein the controller is a first controller configured to control the first portion of the plurality of locators to emit light according to the first emission parameter, the system further comprising a second controller configured to control the second portion of the plurality of locators to emit light according to the second emission parameter.

6. The system of claim 1, wherein:
   according to a first pattern of the plurality of patterns, the controller provides a first signal that causes a first portion of the plurality of locators to emit light and, simultaneously, provides a second signal that causes a second portion of the plurality of locators to emit light; and
   according to a second pattern of the plurality of patterns, the controller provides the first signal that causes the first portion of the plurality of locators to emit light, and does not provide the second signal that causes the second portion of the plurality of emitters to emit light.

7. The system of claim 1, wherein:
   according to a first pattern of the plurality of patterns, the controller provides a first signal that causes at least the portion of the plurality of locators to emit light at a first emissivity; and
   according to a second pattern of the plurality of patterns, the controller provides a second signal that causes the portion of the plurality of locators to emit light at a second emissivity that is lower than the first emissivity.

8. The system of claim 1, wherein:
   according to a first pattern of the plurality of patterns, the controller provides a first signal that causes at least the portion of the plurality of locators to emit light at a first solid-angle condition, the first solid-angle condition increasing visibility of the portion of the plurality of locators at a first position relative to the system; and according to a second pattern of the plurality of patterns, the controller provides a second signal that causes the portion of the plurality of locators to emit light at a second solid-angle condition, the second solid-angle condition increasing visibility of the portion of the plurality of locators at a second position relative to the system.

9. The system of claim 1, wherein:
according to a first pattern of the plurality of patterns, the controller provides a first signal that causes at least the portion of the plurality of locators to emit light at a first wavelength; and
according to a second pattern of the plurality of patterns, the controller provides a second signal that causes the portion of the plurality of locators to emit light at a second wavelength different from the first wavelength.

10. The system of claim 1, wherein each locator is configured to emit light according to a combination of two or more emission parameters selected from a group comprising wavelength, emissivity, pulse rate, and time modulation, and each of the plurality of patterns specifies a setting for the plurality of locators for each of the two or more emission parameters.

11. The system of claim 1, wherein the plurality of locators are configured to emit light according to an emission parameter within a predetermined range for the emission parameter, and at least a portion of the plurality of patterns describe different settings of the emission parameter within the predetermined range.

12. The system of claim 1, wherein the system is a head-mounted display, the head-mounted display further comprising an electronic display configured to display images to a user.

13. A method comprising:
receiving, by communications circuitry of a target object, emission instructions from a pattern controller, the emission instructions specifying a pattern of a plurality of patterns and determined based on a resolution value for adjacent pairs of locators of a plurality of locators on the target object, the resolution value indicative of the pattern controller being able to resolve the adjacent pair of locators as two separate sources;
transmitting, by a controller, a signal to at least a portion of the plurality of locators to emit light according to the pattern specified by the emission instructions; and
emitting light, by at least the portion of the plurality of locators, responsive to the signal.

14. The method of claim 13, further comprising:
receiving, by the communications circuitry, second emission instructions from the pattern controller, the second emission instructions specifying a second pattern of a plurality of patterns, the second pattern determined based on a second resolution value for the light emitted based on the pattern specified by the emission instructions;
transmitting, by the controller, a second signal at least a second portion of the plurality of locators to emit light according to the second pattern specified by the second emission instructions; and
emitting light, by at least the second portion of the plurality of locators, responsive to the second signal.

15. The method of claim 13, wherein the emission instructions describe an emission parameter for each of the plurality of locators, and the signal comprises an instruction to each locator of the plurality of locators to emit light according to the emission parameter for the locator according to the emission instructions.

16. The method of claim 13, wherein the emission instructions describe a first emission parameter for a first portion of the plurality of locators and a second emission parameter for a second portion of the plurality of locators, the method further comprising:
transmitting, to the first portion of the plurality of locators, a first signal to emit light according to the first emission parameter; and
transmitting, to the second portion of the plurality of locators, a second signal to emit light according to the second emission parameter.

17. The method of claim 13, further comprising:
according to a first pattern of the plurality of patterns, providing a first signal that causes a first portion of the plurality of locators to emit light and, simultaneously, providing a second signal that causes a second portion of the plurality of locators to emit light; and
according to a second pattern of the plurality of patterns, providing the first signal that causes the first portion of the plurality of locators to emit light, and not providing the second signal that causes the second portion of the plurality of emitters to emit light.

18. The method of claim 13, further comprising:
according to a first pattern of the plurality of patterns, providing a first signal that causes at least the portion of the plurality of locators to emit light at a first emissivity; and
according to a second pattern of the plurality of patterns, providing a second signal that causes the portion of the plurality of locators to emit light at a second emissivity that is lower than the first emissivity.

19. The method of claim 13, further comprising:
according to a first pattern of the plurality of patterns, providing a first signal that causes at least the portion of the plurality of locators to emit light at a first solid-angle condition, the first solid-angle condition increasing visibility of the portion of the plurality of locators at a first position relative to the system; and
according to a second pattern of the plurality of patterns, providing a second signal that causes the portion of the plurality of locators to emit light at a second solid-angle condition, the second solid-angle condition increasing visibility of the portion of the plurality of locators at a second position relative to the target object.

20. The method of claim 13, further comprising:
according to a first pattern of the plurality of patterns, providing a first signal that causes at least the portion of the plurality of locators to emit light at a first wavelength; and
according to a second pattern of the plurality of patterns, providing a second signal that causes the portion of the plurality of locators to emit light at a second wavelength different from the first wavelength.

* * * * *